(No Model.) 2 Sheets—Sheet 1.

M. B. MANWARING & C. B. STREET.
MANUFACTURE OF VULCANIZED BOTTLE STOPPERS.

No. 309,072. Patented Dec. 9, 1884.

(No Model.) 2 Sheets—Sheet 2.
M. B. MANWARING & C. B. STREET.
MANUFACTURE OF VULCANIZED BOTTLE STOPPERS.
No. 309,072. Patented Dec. 9, 1884.
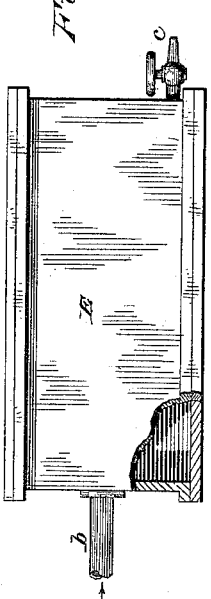
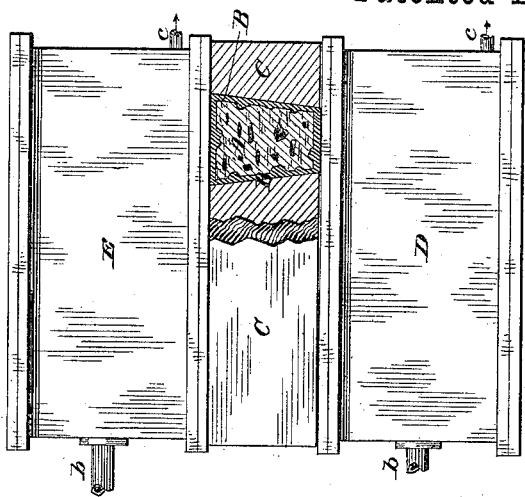
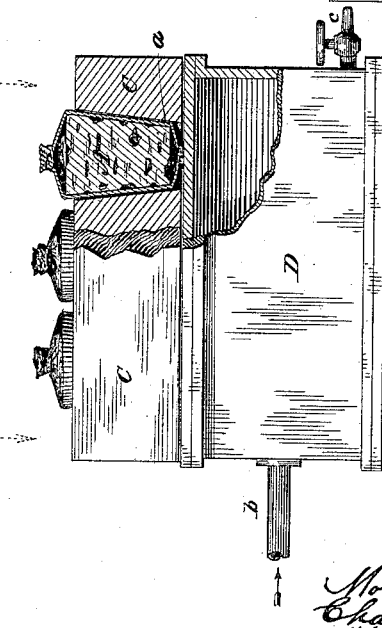
WITNESSES: INVENTOR:

UNITED STATES PATENT OFFICE.

MORRIS B. MANWARING, OF BAYONNE, NEW JERSEY, AND CHARLES B. STREET, OF BOSTON, MASSACHUSETTS; SAID STREET ASSIGNOR TO SAID MANWARING.

MANUFACTURE OF VULCANIZED BOTTLE-STOPPERS.

SPECIFICATION forming part of Letters Patent No. 309,072, dated December 9, 1884.

Application filed July 2, 1884. (No model.)

*To all whom it may concern:*

Be it known that we, MORRIS B. MANWARING, a citizen of the United States, residing at Bayonne, in the county of Hudson and State of New Jersey, and CHARLES B. STREET, a citizen of the United States, residing at Boston, in the county of Suffolk and State of Massachusetts, have invented certain new and useful Improvements in the Manufacture of Vulcanized Bottle-Stoppers, of which the following is a specification, reference being had therein to the accompanying drawings.

This invention relates to vulcanizing apparatus especially designed for making rubber-coated bottle-stoppers.

The object of the invention is to provide a process of and an apparatus for the economical production of such stoppers.

Figure 1:
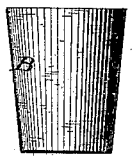
Figure 2:
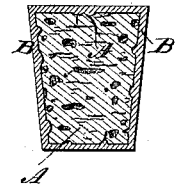
Figure 4:
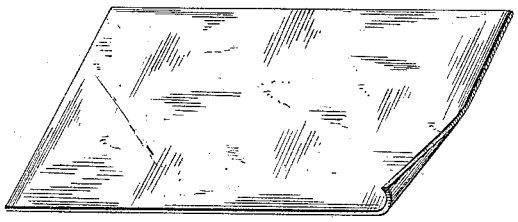
Figure 3:
Figure 5:

In the accompanying drawings, Figure 1 is a side elevation of a bottle-stopper made by this apparatus. Fig. 2 is a vertical central section through said stopper. Fig. 3 is a perspective view of the core of said stopper, which consists of an ordinary stopper of cork-wood or other suitable material. Fig. 4 is a perspective view of a piece of thin sheet-rubber in which the cork is wrapped. Fig. 5 is a view of the cork-wood core wrapped in the piece of sheet-rubber preparatory to vulcanization in this apparatus. Fig. 6 is a side elevation of this improved vulcanizing apparatus for vulcanizing the sheet-rubber around the core, a portion of the apparatus being shown in section, the relative positions of the several parts being that occupied by them immediately before the vulcanization of the rubber. Fig. 7 is a view of said vulcanizing apparatus, the relative positions of the several parts thereof being that occupied by them during the process of vulcanization. Fig. 8 is a top plan view of the mold-plate constituting a part of this vulcanizing apparatus.

Similar letters of reference indicate corresponding parts in the different figures.

This apparatus comprises two steam-chests, D E, having flat surfaces, and a mold-plate, C, adapted to be placed between said chests. The mold-plate C is composed of metal, and is of a thickness equal to the length of a completed stopper, being somewhat thicker than the cores thereof, and is provided with a series of mold-holes, $a$, which preferably taper from the upper to the lower face of the mold-plate. The steam-chests D and E are provided with a steam-inlet pipe, $b$, and an outlet-pipe, $c$, for the condensed steam.

In the use of this apparatus for the making of rubber-coated bottle-stoppers, the cores A of the desired shape and size are selected or prepared, which cores are preferably composed of cork-wood in the form of an ordinary cork-wood stopper, and for this purpose cork-wood stoppers of an inferior quality may be used, as the coating to be applied will cover all defects. Each core is then wrapped or rolled up in a piece or sheet of thin unvulcanized rubber or composition of caoutchouc and sulphur, such as that illustrated in Fig. 4, the ends of the rubber wrapper being twisted at the opposite ends of the core, as illustrated in Fig. 5. The wrapped cores are then placed in the mold-holes $a$ of the mold-plate C, and said mold-plate placed upon the upper face of the steam-chest D. Steam is then admitted to the chests, and when the wrapped cores have been heated to a vulcanizing temperature the steam-chest E is pressed down upon the mold-plate C and said wrapped cores pushed into the mold. The heat and pressure are continued until the wrappings of the cores are fused and the vulcanizing completed. Then the mold-plate is removed from the steam-chests and the finished stoppers pushed out of the mold-holes. The mold-holes are then again filled with wrapped cores and the operation repeated.

In the vulcanization of the rubber coating onto the core the rubber enters the pores and indents of the latter, and the coating and core are thus firmly united, so as to form substantially one integral whole. The coating B completely covers the core, and as thus constructed the bottle-stopper combines the advantages of a cork-wood stopper with those of a solid rubber stopper.

We claim as our invention—

1. The combination, in a vulcanizing apparatus, of a mold-plate provided with round holes extending therethrough, and steam-chests between which said plate is adapted to fit, substantially as set forth.

2. The combination, in a vulcanizing apparatus, of a mold-plate provided with round tapering holes extending therethrough, and steam-chests between which said plate is adapted to fit, substantially as set forth.

3. A mold-plate for vulcanizing bottle-stoppers, of a thickness equal to the length of the stopper to be formed, and provided with holes extending through the plate and open on both sides thereof, substantially as described.

4. The method of making a rubber-coated bottle-stopper, which consists in loosely wrapping a core within a thin sheet of rubber and then subjecting the wrapped core to pressure and heat in a tubular mold, substantially as described.

MORRIS B. MANWARING.
CHARLES B. STREET.

Witnesses as to Morris B. Manwaring:
W. M. ANDRUS,
CHAS. D. PHELPS.

Witnesses as to Charles B. Street:
STEPHEN W. TROWBRIDGE,
CHAS. HALL ADAMS.